(12) United States Patent  
Sauerwald

(10) Patent No.: US 7,584,314 B1  
(45) Date of Patent: Sep. 1, 2009

(54) UNIVERSAL SERIAL-TO-PARALLEL AND PARALLEL-TO-SERIAL CABLE INTERFACE AND METHOD

(75) Inventor: Mark Sauerwald, Cumberland, ME (US)

(73) Assignee: National Semiconductor Corporation, Santa Clara, CA (US)

( * ) Notice: Subject to any disclaimer, the term of this patent is extended or adjusted under 35 U.S.C. 154(b) by 137 days.

(21) Appl. No.: 11/702,285

(22) Filed: Feb. 5, 2007

(51) Int. Cl.
*G06F 3/00* (2006.01)

(52) U.S. Cl. .............................. 710/64; 710/62; 710/63; 710/65; 710/66; 710/71

(58) Field of Classification Search .................. 710/64, 710/62, 63, 65, 66, 71
See application file for complete search history.

(56) References Cited

U.S. PATENT DOCUMENTS

| | | | | |
|---|---|---|---|---|
| 6,104,732 | A * | 8/2000 | Pearman | 370/541 |
| 2003/0142233 | A1 * | 7/2003 | Eckhardt et al. | 348/512 |

OTHER PUBLICATIONS

"Faraday SerDes IP, Universal Programmable SerDes IP," Faraday, 2 pages.
"Serial Digital Interface Reference Design for Cyclone & Stratix Devices," Altera Corporation, Aug. 2004, ver. 1.1, 14 pages.
"3G, HD & SD Dual Output Cable Equalizer," Mindspeed Technologies, Inc., 2006, 2 pages.
Dave Bursky, "FPGA Combines Multiple Serial Interfaces and Logic," Electronic Design, Oct. 2, 2000, 5 pages.
"LMH0002, SMPTE 292M/259M Serial Digital Cable Driver," National Semiconductor Corporation, Oct. 2006, 6 pages.
"LMH0034, SMPTE 292M/259M Adaptive Cable Equalizer," National Semiconductor Corporation, Jun. 2006, 7, pages.
"SCAN25100, 2457.6, 1228.8, and 614.4 Mbps CPRI SerDes with Auto RE Sync and Precision Delay Calibration Measurement," National Semiconductor Corporation, Nov. 2006, 14 pages.
"LMH0040, 5:1 Serial Digital Video Serializer and Driver," National Semiconductor Corporation, Oct. 24, 2006, 11 pages.
"LMH0041, 1:5 Serial Digital Video Deserializer with Loopthrough," National Semiconductor Corporation, Dec. 1, 2006, 12 pages.
LMH0046, HD/SD/ SDI Reclocker with Dual Differential Outputs, National Semiconductor Corporation, Jul. 2006, 12 pages.

* cited by examiner

*Primary Examiner*—Niketa I Patel

(57) ABSTRACT

A universal cable interface and associated system and method are provided for coupling a transmission medium to a processing device. The universal cable interface can selectively operate in a first (input) mode and a second (output) mode. The universal cable interface can also handle different types of data, such as standard definition video data and high definition video data. When operating in the first mode, the universal cable interface may receive serial data over the transmission medium and convert the serial data into a parallel format for transmission to the processing device. When operating in the second mode, the universal cable interface may receive parallel data from the processing device and convert the parallel data into a serial format for transmission over the transmission medium.

20 Claims, 3 Drawing Sheets

UNIVERSAL SERIAL-TO-PARALLEL AND PARALLEL-TO-SERIAL CABLE INTERFACE AND METHOD

TECHNICAL FIELD

This disclosure is generally directed to cable interfaces and more specifically to a universal cable interface and method.

BACKGROUND

Many different electronic devices are coupled to cables that carry electrical signals during operation. For example, broadcast video equipment is often coupled to coaxial cables or other cables capable of transporting video and audio signals. In the broadcast video industry, there are many different types of products, although often times there may be a relatively low volume of a particular product in actual use. As a result, equipment designers often need to design a product with the maximum amount of flexibility. A proposed new product can, for example, take advantage of the flexibility inherent in a field programmable gate array (FPGA). However, the proposed new product often has a very inflexible part of its design, namely its cable interface.

Today, there are specialized serializers (transmitters) and deserializers (receivers) for standard definition and high definition video content. This often makes it necessary for equipment manufacturers to design and build multiple specialized boards for a single product. Multiple boards are often needed to satisfy all of the various possible uses, such as different boards for different functions (like time code inserters, logo inserters, and format converters) and different content (like standard definition and high definition). Moreover, this often requires the use of more powerful or expensive FPGAs in a product since the FPGAs may, in some circumstances, be required to perform analog processing functions.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
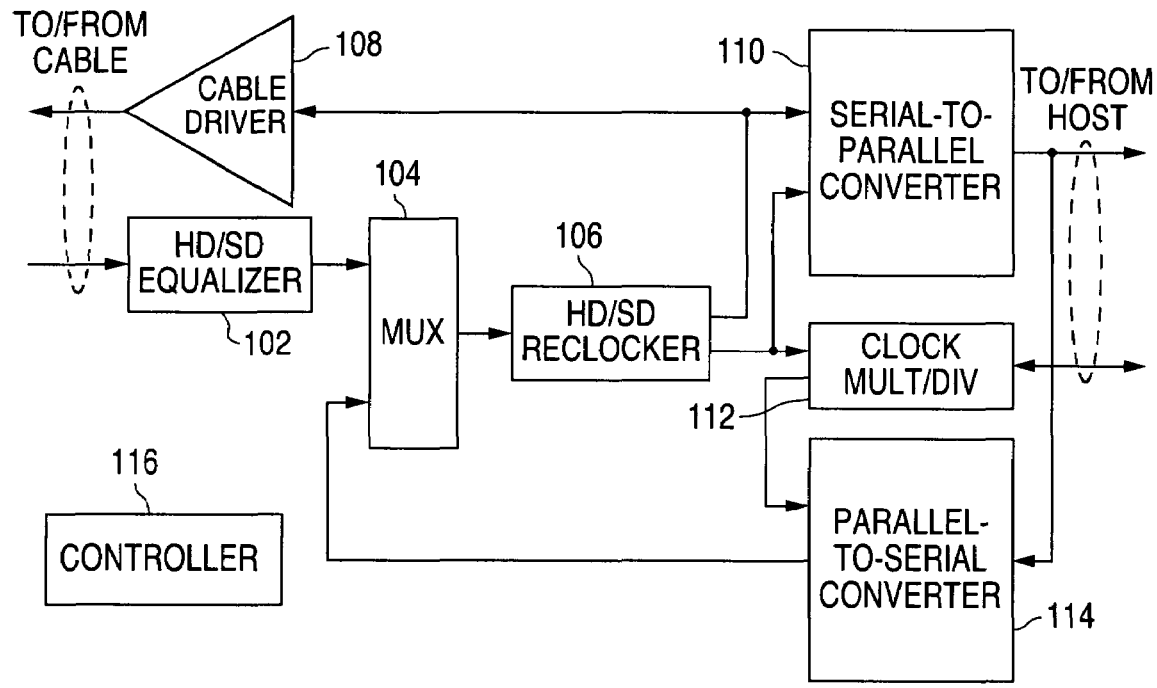
FIG. 1 illustrates an example universal cable interface.

FIG. 1 illustrates an example universal cable interface 100. The universal cable interface 100 could, for example, be used in video equipment or other equipment for coupling a coaxial cable or other connector to the equipment. The embodiment of the universal cable interface 100 shown in FIG. 1 is for illustration only. Other embodiments of the universal cable interface 100 could be used without departing from the scope of this disclosure.

In one aspect of operation, the universal cable interface 100 supports a universal interface between a cable (such as a coaxial cable) and a host processing device (such as an FPGA). This means the universal cable interface 100 can be configured as an input or an output, and the universal cable interface 100 could be configured to handle standard definition (SD) video signals and high definition (HD) video signals. This may allow equipment manufacturers to design a product with one or multiple universal cable interfaces 100 and an FPGA or other processing device, and the FPGA or other processing device can be programmed to define the product's function at a later time. This may allow equipment manufacturers to manufacture products in higher volumes, which may provide a cost savings over conventional design techniques. Also, because of the design of the universal cable interface 100, equipment manufacturers may be able to use less complex or less powerful (and therefore less expensive) FPGAs or other processing devices since some or all analog functionality can be offloaded into the universal cable interface 100.

As shown in FIG. 1, the universal cable interface 100 includes a cable equalizer 102. The equalizer 102 is capable of equalizing data received over a cable, such as a coaxial cable or other media exhibiting dispersive loss characteristics. The equalizer 102 could receive and equalize standard definition or high definition video signals. The equalizer 102 could operate on data having a range of data rates, such as 143 megabits per second (Mbps) to 2.97 gigabits per second (Gbps). The equalizer 102 could also support any suitable standard related to video signals, such as the Society of Motion Picture and Television Engineers (SMPTE) 292M, 344M, 259M, and 424M standards. The equalizer 102 represents any suitable device or component capable of equalizing data. The equalizer 102 could, for example, represent an LMH0034 adaptive cable equalizer from NATIONAL SEMICONDUCTOR CORPORATION.

The output of the equalizer 102 is provided to a multiplexer 104, which can also receive a second input. The multiplexer 104 selects one of the two inputs for output to a reclocker 106. The specific input selected by the multiplexer 104 could be determined based on whether the universal cable interface 100 is being used as an input or an output. The multiplexer 104 represents any suitable device or component for selecting one of multiple inputs for output.

The reclocker 106 performs clock and data recovery on received serial data, such as by extracting a clock signal from the serial data. The clock signal could then be used in any suitable manner, such as to suppress accumulated jitter in the serial data. The reclocker 106 can operate on any suitable data, such as data conforming to the SMPTE 259M (A and C), SMPTE 292M, and SMPTE 424M standards at rates of 143 Mbps, 270 Mbps, 1.483 Gbps, 1.485 Gbps, and 2.97 Gbps. In this example, the reclocker 106 has two outputs. The upper output may represent the serial data, which could be provided via two differential outputs. The lower output may represent a low-jitter, serial data rate clock recovered by the reclocker 106. The reclocker 106 represents any suitable device or component for performing clock and data recovery, such as an LMH0046 HD/SD Serial Digital Interface (SDI) reclocker with dual differential outputs from NATIONAL SEMICONDUCTOR CORPORATION.

The serial data from the reclocker 106 can be provided to a cable driver 108. The cable driver 108 drives the cable or other transmission medium that is coupled to the equalizer 102. The cable driver 108 could, for example, drive a 75Ω transmission line at rates up to 1.485 Gbps. The cable driver 108 could also support multiple slew rates for SMPTE 259M, SMPTE 292M, and SMPTE 424M compliance. The cable driver 108 represents any suitable device or component for driving a transmission line, such as an LMH0002 serial digital cable driver from NATIONAL SEMICONDUCTOR CORPORATION.

The serial data from the reclocker 106 can also be provided to a serial-to-parallel converter 110. The converter 110 receives serial data from the reclocker 106 and converts the data into a parallel format. For example, the converter 110 could convert serial data into 4-bit or 5-bit parallel values. The converter 110 represents any suitable device or component for converting serial data into parallel data. The parallel data generated by the converter 110 could be provided to any suitable destination, such as an FPGA or other host processing device. By converting the serial data into a parallel format, the deserialization may reduce the data rate to a lower speed, allowing the data to be handled by a less powerful or lower cost FPGA or other host processing device.

The clock recovered by the reclocker 106 can be provided to the serial-to-parallel converter 110 and to a clock multiplier/divider 112. The clock multiplier/divider 112 can also receive a clock signal from an external source, such as an FPGA or other host processing device. The clock multiplier/divider 112 then multiplies or divides the received clock signal, such as by multiplying or dividing the received clock signal by four or five. Whether the clock multiplier/divider 112 multiplies or divides the received clock signal may depend on whether the universal cable interface 100 is used as an input or an output. The clock multiplier/divider 112 represents any suitable device or component for multiplying or dividing a clock signal. By performing the clock multiplication or division in the universal cable interface 100, the FPGA or other host processing device need not perform this function, which may again allow the use of a less powerful or lower cost FPGA or other host processing device.

The universal cable interface 100 also includes a parallel-to-serial converter 114. The converter 114 receives parallel data from an external source (such as an FPGA or other host processing device) and converts the data into a serial format. For example, the converter 114 could convert 4-bit or 5-bit parallel data into serial format. The serial data generated by the converter 114 is provided to the multiplexer 104, which selects either the equalized data from the equalizer 102 or the serialized data from the converter 114 for output to the reclocker 106. The converter 114 represents any suitable device or component for converting parallel data into serial data.

A controller 116 controls the overall operation of the universal cable interface 100. For example, the controller 116 can control the multiplexer 104 to control which data is provided to the reclocker 106. The controller 116 could also configure certain components, such as by configuring the clock multiplier/divider 112 as a multiplier or a divider. In addition, the controller 116 could enable certain components and disable other components. These actions could be based on whether the universal cable interface 100 is being used as an input or an output. The controller 116 includes any hardware, software, firmware, or combination thereof for controlling the universal cable interface 100.

As described above, depending on the configuration of the universal cable interface 100, the universal cable interface 100 can function as an interface between a cable carrying data (such as SDI data) and a host processing device (such as an FPGA). The universal cable interface 100 can operate as an input or an output and handle standard definition or high definition video data. Because of this, the universal cable interface 100 could be used in a wide variety of applications. For example, it could be used in devices such as switchers or camcorders, which traditionally require parallel data communication. The universal cable interface 100 could also be used in applications such as a small-medium router, where an FPGA could replace a crosspoint switch normally used in the router. The universal cable interface 100 could represent a single component that can be used in any interface (input or output).

Figure 2:
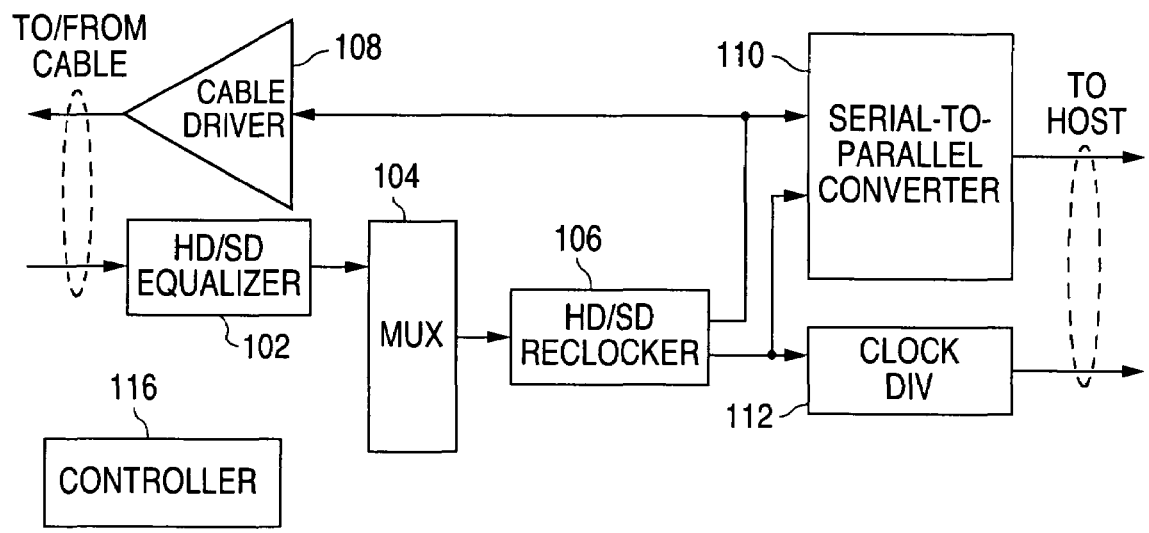
FIGS. 2 and 3 illustrate example configurations of the universal cable interface of FIG. 1.
Figure 3:
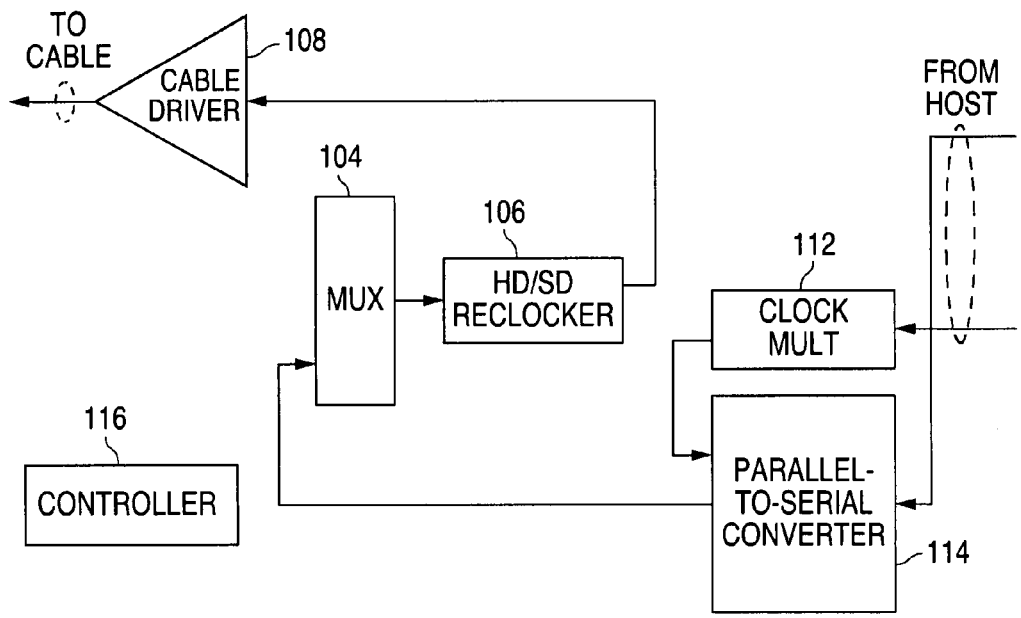

FIGS. 2 and 3 illustrate example configurations of the universal cable interface 100 of FIG. 1. More specifically, FIG. 2 illustrates the universal cable interface 100 configured in receive (input) mode, and FIG. 3 illustrates the universal cable interface 100 configured in transmit (output) mode.

As shown in FIG. 2, in the receive or input mode, an input signal is brought in through the equalizer 102 and provided to the reclocker 106 via the multiplexer 104. The output of the reclocker 106 is supplied to the cable driver 108, providing an active loopthrough (a buffered or delayed version of the input signal). The output of the reclocker 106 is also supplied to the serial-to-parallel converter 110 for conversion to a parallel format. The recovered clock from the reclocker 106 is provided to the serial-to-parallel converter 110 and to the clock multiplier/divider 112 (which in this configuration is operating as a clock divider). The clock multiplier/divider 112 slows the rate of the recovered clock provided by the reclocker 106, such as by slowing the rate to one-fourth or one-fifth of the original rate. If the input signal is a high definition signal, this could slow the data rate to approximately 400 Mbps. The lower-rate data and the clock could be provided to a host processing device, such as a low-end FPGA (Spartan or Cyclone), and the remainder of the processing could be done within the host processing device.

As shown in FIG. 3, in the transmit or output mode, parallel data is received by the parallel-to-serial converter 114 and converted into serial data. An input clock signal is received by the clock multiplier/divider 112 (which in this example is configured as a multiplier), and the clock multiplier/divider 112 increases the rate of the clock signal (such as by multiplying the clock rate by four or five). The multiplied clock signal is provided to the parallel-to-serial converter 114 for use in converting the parallel data into serial data. The serialized data is provided to the reclocker 106 via the multiplexer 104, and the reclocker 106 reclocks the data. This may be helpful, for example, in removing any requirements for a very pure clock coming from the FPGA or other host processing device. The reclocked data is then sent out through the cable driver 108.

In some embodiments, the converters 110 and 114 share the same inputs/outputs (such as a set of input/output pins). When the universal cable interface 100 is configured as a receiver (input mode), the serial-to-parallel converter 110 provides parallel data to an FPGA or other host processing device via the input/output pins. When the universal cable interface 100 is configured as a transmitter (output mode), the parallel-to-serial converter 114 receives parallel data from an FPGA or other host processing device via the input/output pins.

In particular embodiments, the equalizer input and the cable driver output might be connected outside of a package containing the universal cable interface 100. This could cause a loss of the loopthrough function while still allowing the universal cable interface 100 to be used as an input or an output.

Based on the above-described functionality, the universal cable interface 100 may be used to implement a cable interface in video or other equipment. Moreover, the universal cable interface 100 could be used in various parallel devices or to implement conventional serial devices as parallel devices. For example, to design an 8×8 router, it might ordinarily require eight equalizers, eight reclockers, eight cable drivers, and an 8×8 crosspoint switch. Based on this disclosure, sixteen universal cable interfaces 100 could be tied to a small FPGA programmed to implement the crosspoint functionality. To implement a 12×4 router, the exact same design could be used by changing the configuration of the universal cable interfaces 100 (converting four outputs into inputs) via software, rather than redesigning the 8×8 router. Designers could design truly modular products, with the only design question being how many universal cable interfaces 100 are required in a product. Given that, the designer could design a product, and its functionality (such as distribution amplifier, mixer, or logo inserter functionality) could be programmed after the product is assembled.

Figure 4:
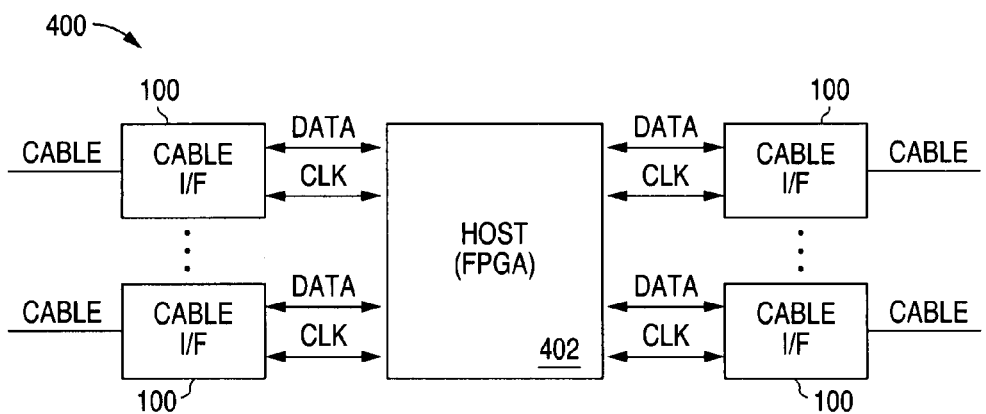
FIG. 4 illustrates an example device for transmitting or receiving signals using a universal cable interface.

An example use of the universal cable interface 100 is shown in FIG. 4. FIG. 4 illustrates an example device 400 for transmitting or receiving signals using one or more universal cable interfaces 100. In this example, the device 400 includes a host processing device 402 (such as an FPGA) coupled to multiple universal cable interfaces 100. Each of the universal cable interfaces 100 is coupled to a cable, such as a coaxial cable or other transmission medium. In this example, the device 400 could be configured as a router, where the host processing device 402 is used to transport data between different universal cable interfaces 100. The exact number of inputs and outputs of the router is easily configurable by adjusting one or more of the universal cable interfaces 100. The same device 400 could be used to perform other functions by configuring the universal cable interfaces 100 and programming the host processing device 402 appropriately.

Although FIGS. 1 through 4 illustrate an example universal cable interface 100, example configurations of the universal cable interface 100, and an example use of the universal cable interface 100, various changes could be made to FIGS. 1 through 4. For example, the universal cable interface 100 could include any other or additional components based on particular needs. Also, various components in the universal cable interface 100 could be combined or further subdivided. In addition, any suitable device could use the universal cable interface 100.

Figure 5:
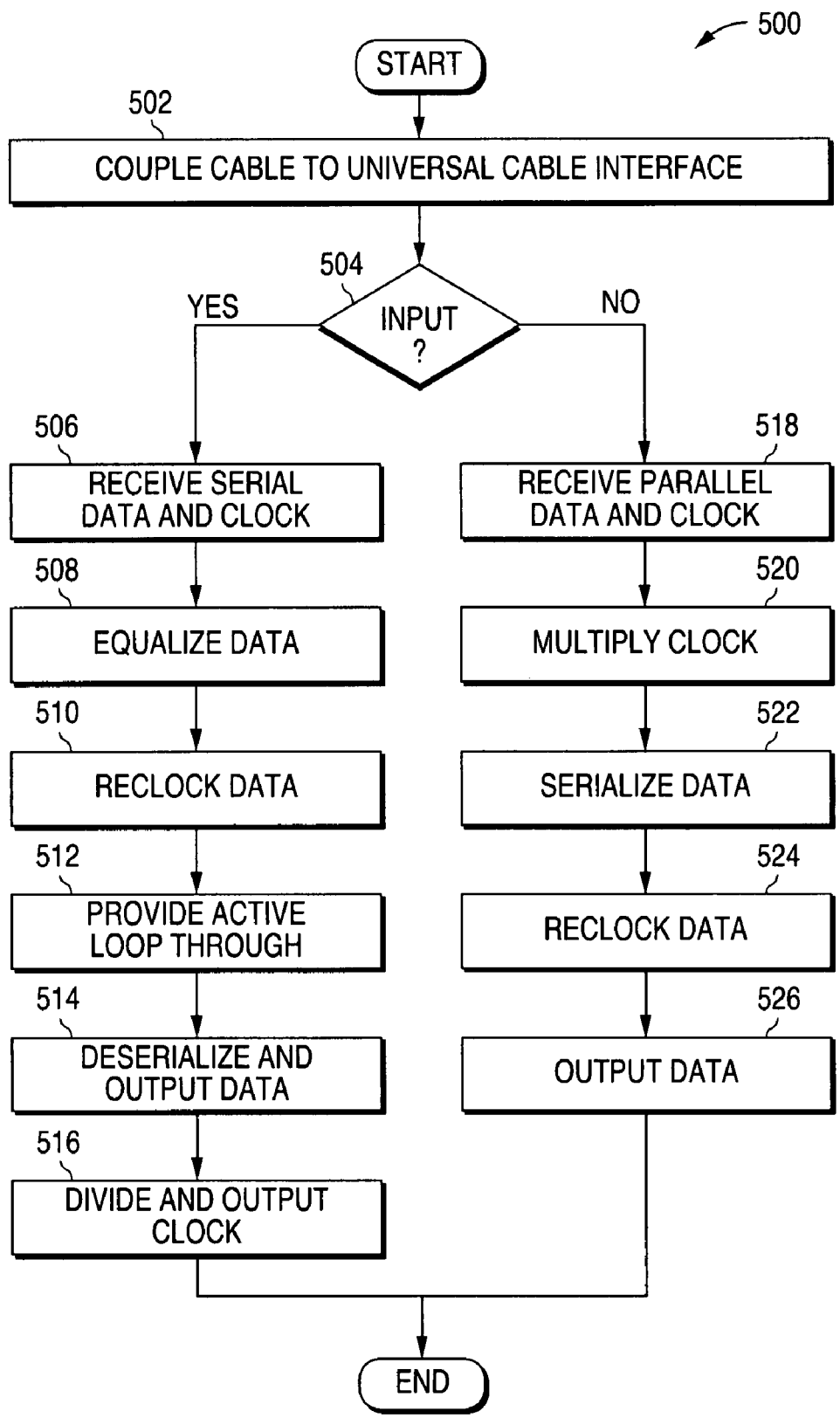
FIG. 5 illustrates an example method for transmitting or receiving signals using a universal cable interface.

FIG. 5 illustrates an example method 500 for transmitting or receiving signals using a universal cable interface. The embodiment of the method 500 shown in FIG. 5 is for illustration only. Other embodiments of the method 500 could be used without departing from the scope of this disclosure. Also, for ease of explanation, the method 500 is described with respect to the universal cable interface 100 of FIG. 1 configured as shown in FIGS. 2 and 3. The method 500 could be used with any suitable device in any suitable configuration.

A cable is coupled to a universal cable interface at step 502. This could include, for example, coupling a coaxial cable or other transmission medium to the universal cable interface 100. The cable can be connected to the universal cable interface 100 in any suitable manner, such as by using a BNC connector (for a coaxial cable).

A determination is made whether the universal cable interface is used as an input or an output at step 504. This could include, for example, the controller 116 in the universal cable interface 100 determining whether the universal cable interface 100 has been configured to operate as an input or an output.

If configured to operate as an input, data and clock signals are received via the cable at step 506. The data may represent serial data, such as serial standard definition or high definition video data, from any suitable source. The data is equalized at step 508. This could include, for example, the equalizer 102 in the universal cable interface 100 receiving and equalizing the serial data. The data is reclocked at step 510. This could include, for example, the reclocker 106 receiving the equalized serial data via the multiplexer 104 and reclocking the serial data to remove any accumulated jitter. An active loopthrough of the serial data is provided at step 512. This could include, for example, providing the equalized serial data to the cable driver 108 for output. The reclocked data is deserialized and output in parallel format at step 514. This could include, for example, the serial-to-parallel converter, 110 converting the reclocked data into a parallel format and outputting the parallel data to an FPGA or other processing device or destination. A recovered clock signal is divided and output at step 516. This could include, for example, the clock multiplier/divider 112 dividing the clock signal by four or five and outputting the divided clock signal to the FPGA or other processing device or destination. In these steps, the controller 116 could take any necessary actions to ensure the universal cable interface 100 is configured appropriately. This could include setting the multiplexer 104 to provide the output of the equalizer 102 to the reclocker 106 and configuring the clock multiplier/divider 112 to divide the clock signal received from the reclocker 106.

If configured to operate as an output, data and clock signals are received at step 518. The data may represent parallel data, such as parallel data from an FPGA or other processing device or other source. The clock signal is multiplied and output at step 520. This could include, for example, the clock multiplier/divider 112 multiplying the clock signal by four or five and outputting the clock signal to the parallel-to-serial converter 114. The received data is serialized at step 522. This could include, for example, the parallel-to-serial converter 114 converting the received data into a serial format and outputting the serial data to the multiplexer 104. The serialized data is reclocked at step 524. This could include, for example, the reclocker 106 receiving the serialized data via the multiplexer 104 and reclocking the serialized data. The reclocked data is then output at step 526. This could include, for example, outputting the reclocked serial data over a cable via the cable driver 108. In these steps, the controller 116 could again take any necessary actions to ensure the universal cable interface 100 is configured appropriately. This could include setting the multiplexer 104 to provide the output of the parallel-to-serial converter 114 to the reclocker 106 and configuring the clock multiplier/divider 112 to multiply the clock signal received from an external source.

Although FIG. 5 illustrates one example of a method 500 for transmitting or receiving signals using a universal cable interface, various changes may be made to FIG. 5. For example, the universal cable interface 100 could be defined as an input or output and configured appropriately prior to execution of the method 500, and step 504 might not involve any actual determinations made by the universal cable interface 100. Also, while shown as a series of steps, various steps in FIG. 5 could overlap or occur in parallel.

It may be advantageous to set forth definitions of certain words and phrases that have been used within this patent document. The term "couple" and its derivatives refer to any direct or indirect communication between two or more components, whether or not those components are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. An apparatus comprising: circuitry operable to receive serial data over a transmission medium and convert the serial data into a parallel format for transmission in a first mode, the circuitry also configured to receive parallel data and convert the parallel data into a serial format for transmission over the transmission medium in a second mode; and a controller configured to selectively configure the circuitry to operate in the first mode or the second mode; wherein the circuitry comprises: an equalizer configured to (i) equalize the serial data from the transmission medium to produce equalized serial data and (ii) output the equalized serial data: a parallel-to-serial converter configured to (i) convert the parallel data into the serial format to produce serialized data and (ii) output the serialized data: a multiplexer having a first input coupled to an output of the equalizer and a second input coupled to an output of the parallel-to-serial converter, the multiplexer configured to output a serial data signal comprising one of the equalized serial data and the serialized data depending on whether the circuitry is configured to operate in the first mode or the second mode; a reclocker having an input coupled to an output of the multiplexer, the reclocker configured to (i) reclock the serial data signal provided by the multiplexer to produce a reclocked serial data signal and (ii) provide the reclocked serial data signal to a cable driver, the cable driver configured to transmit the reclocked serial data signal over the transmission medium; a serial-to-parallel converter configured to (i) convert the reclocked serial data signal into the parallel format to produce parallelized data and (ii) output the parallelized data: and a clock multiplier/divider configured as a clock divider in the first mode and a clock multiplier in the second mode, the clock divider configured to divide a first clock signal received from the reclocker and to output the divided first clock signal in the first mode, the clock multiplier configured to multiply a second clock signal and to output the multiplied second clock signal to the parallel-to-serial converter in the second mode.

2. The apparatus of claim 1, wherein the reclocker is configured to reclock the serial data signal to reduce jitter.

3. The apparatus of claim 1, wherein the controller is configured to selectively configure the circuitry by configuring the multiplexer to output the equalized serial data to the reclocker and by configuring the clock multiplier/divider as the clock divider in the first mode.

4. The apparatus of claim 1, wherein the cable driver is configured to output the reclocked serial data signal over the transmission medium in the first mode to provide an active loopthrough of the serial data.

5. The apparatus of claim 1, wherein the parallel-to-serial converter and the serial-to-parallel converter share a common set of input/output pins.

6. The apparatus of claim 1, wherein the controller is configured to selectively configure the circuitry by configuring the multiplexer to output the serialized data to the reclocker and by configuring the clock multiplier/divider as the clock multiplier in the second mode.

7. The apparatus of claim 1, wherein the circuitry is configured to handle standard definition video data and high definition video data in serial and parallel formats.

8. The apparatus of claim 1, wherein: the transmission medium comprises a coaxial cable; and a field programmable gate array is configured to at least one of: receive the serial data converted into the parallel format and provide the parallel data.

9. A system comprising: a processing device; and an interface configured to be coupled to a transmission medium, the interface configured to selectively operate in a first mode or a second mode, the interface configured to receive serial data over the transmission medium and convert the serial data into a parallel format for transmission as first parallel data to the processing device in the first mode, the interface configured to receive second parallel data from the processing device and convert the second parallel data into a serial format for transmission over the transmission medium in the second mode; wherein the interface comprises: an equalizer configured to (i) equalize the serial data from the transmission medium to produce equalized serial data and (ii) output the equalized serial data; a parallel-to-serial converter configured to (i) convert the second parallel data into the serial format to produce serialized data and (ii) output the serialized data: a multiplexer having a first input coupled to an output of the equalizer and a second input coupled to an output of the parallel-to-serial converter, the multiplexer configured to output a serial data signal comprising one of the equalized serial data and the serialized data depending on whether the interface is configured to operate in the first mode or the second mode: a reclocker having an input coupled to an output of the multiplexer, the reclocker configured to (i) reclock the serial data signal provided by the multiplexer to produce a reclocked serial data signal and (ii) provide the reclocked serial data signal to a cable driver, the cable driver configured to transmit the reclocked serial data signal over the transmission medium; a serial-to-parallel converter operable to (i) convert the reclocked serial data signal into the parallel format to produce parallelized data and (ii) output the parallelized data to the processing device as the first parallel data: and a clock multiplier/divider configured as a clock divider in the first anode and a clock multiplier in the second anode, the clock divider configured to divide a first clock signal received from the reclocker and to output the divided first clock signal to the processing device in the first mode, the clock multiplier operable to multiply a second clock signal received from the processing device and to output the multiplied second clock signal to the parallel-to-serial converter in the second mode.

10. The system of claim 9, wherein the reclocker is configured to reclock the serial data to reduce jitter.

11. The system of claim 9, wherein the interface further comprises: a controller configured to selectively configure the interface by configuring the multiplexer to output the equalized serial data to the reclocker and by configuring the clock multiplier/divider as the clock divider in the first mode.

12. The system of claim 9, wherein the cable driver is configured to output the reclocked serial data signal over the transmission medium in the first mode to provide an active loopthrough of the serial data.

13. The system of claim 9, wherein the parallel-to-serial converter and the serial-to-parallel converter share a common set of input/output pins.

14. The system of claim 9, wherein the interface further comprises a controller configured to selectively configure the interface by configuring the multiplexer to output the serialized parallel data to the reclocker and by configuring the clock multiplier/divider as the clock multiplier in the second mode.

15. The system of claim 9, wherein the interface is configured to handle standard definition video data and high definition video data in serial and parallel formats.

16. The system of claim 9, wherein: the transmission medium comprises a coaxial cable; and the processing device comprises a field programmable gate array.

17. The system of claim 9, wherein: the processing device is programmed to function as a crosspoint switch; the interface comprises one of a plurality of interfaces; the processing device and the plurality of interfaces function as a router; and a number of inputs of the router and a number of outputs of the router are configurable depending on how many of the interfaces operate in the first mode and how many of the interfaces operate in the second mode.

18. A method comprising: coupling a transmission medium to an interface, the interface also coupled to a processing device; selectively configuring the interface to operate in a first mode or a second model; receiving serial data over the transmission medium, equalizing the serial data to produce equalized serial data, providing the equalized serial data as a first input to a multiplexer, outputting the equalized serial data by the multiplexer to a reclocker, reclocking the equalized serial data using the reclocker to produce reclocked equalized serial data, dividing a first clock signal from the reclocker using a clock multiplier/divider configured as a clock divider, converting the reclocked equalized serial data into a parallel format to produce parallelized data and transmitting the parallelized data and the divided first clock signal to the processing device in the first mode; and receiving parallel data and a second clock signal from the processing device, multiplying the second clock signal using the clock multiplier/divider configured as a clock multiplier converting the parallel data into a serial format using the multiplied second clock signal to produce serialized data, providing the serialized data as a second input to the multiplexer, outputting the serialized data by the multiplexer to the reclocker, reclocking the serialized data using the reclocker to produce reclocked serialized data, and providing the reclocked serialized data to a cable driver for transmission over the transmission medium in the second mode.

19. The method of claim 18, wherein: the processing device is programmed to function as a crosspoint switch; the interface comprises one of a plurality of interfaces; and the processing device and the plurality of interfaces function as a router.

20. The method of claim 19, further comprising: configuring the plurality of interfaces to provide a selected number of inputs and a selected number of outputs for the router.

* * * * *